(12) United States Patent
Cleary

(10) Patent No.: US 7,094,305 B2
(45) Date of Patent: Aug. 22, 2006

(54) METHOD FOR PARTICLE PRODUCTION

(76) Inventor: Michael Cleary, School House, School Lane, Thurstaston, Wirral CH61 OHH (GB)

( * ) Notice: Subject to any disclaimer, the term of this patent is extended or adjusted under 35 U.S.C. 154(b) by 0 days.

(21) Appl. No.: 11/059,952

(22) Filed: Feb. 17, 2005

(65) Prior Publication Data

US 2005/0140063 A1    Jun. 30, 2005

Related U.S. Application Data

(63) Continuation-in-part of application No. 10/068,611, filed on Feb. 6, 2002, now abandoned.

(51) Int. Cl.
 G03C 5/00      (2006.01)
 G09F 3/02      (2006.01)
 B23K 26/02     (2006.01)

(52) U.S. Cl. ............... 156/248; 156/257; 156/264; 156/268; 156/270; 156/277; 156/272.8; 156/64; 156/378; 156/389; 283/76; 430/8

(58) Field of Classification Search ............... 156/248, 156/257, 264, 268, 270, 277, 272.8, 64, 378, 156/389; 283/76; 430/8
See application file for complete search history.

(56) References Cited

U.S. PATENT DOCUMENTS

| | | | |
|---|---|---|---|
| 3,861,886 A | 1/1975 | Meloy | |
| 3,897,284 A | 7/1975 | Livesay | |
| 4,053,433 A | 10/1977 | Lee | |
| 4,131,064 A | 12/1978 | Ryan et al. | |
| 4,243,734 A * | 1/1981 | Dillon | ............... 430/8 |
| 4,329,393 A | 5/1982 | LaPerre et al. | |
| 4,390,452 A | 6/1983 | Stevens | |
| 4,606,927 A | 8/1986 | Jones | |
| 4,724,219 A | 2/1988 | Ridinger | |
| 4,767,205 A | 8/1988 | Schwartz et al. | |
| 4,990,583 A | 2/1991 | Wamprecht et al. | |
| 6,309,690 B1 | 10/2001 | Brogger et al. | |
| 6,432,715 B1 | 8/2002 | Nelson et al. | |
| 6,501,825 B1 | 12/2002 | Kaiser et al. | |
| 6,527,965 B1 | 3/2003 | Gee et al. | |
| 6,541,731 B1 | 4/2003 | Mead et al. | |
| 6,620,360 B1 | 9/2003 | Simons | |
| 2002/0084329 A1 | 7/2002 | Kaye et al. | |
| 2002/0129523 A1 | 9/2002 | Hunt | |
| 2003/0153092 A1 * | 8/2003 | Skinner et al. | ............... 436/174 |

FOREIGN PATENT DOCUMENTS

| | | |
|---|---|---|
| EP | 0757830 B1 | 12/1998 |
| GB | 2 289 150 | 11/1995 |
| GB | 2 334 347 | 8/1999 |
| GB | 2 369 078 | 5/2002 |
| WO | WO 99/44044 | 9/1999 |

* cited by examiner

Primary Examiner—Linda Gray
(74) Attorney, Agent, or Firm—Collard & Roe, P.C.

(57) ABSTRACT

A method of producing batches of micro particles includes affixing a substrate sheet to a support and cutting the substrate sheet with a laser device to define a plurality of micro particles. Before, after or during the cutting of the substrate sheet, the region of the substrate sheet defining each micro particle is marked with a code or other identifying marking using a laser device. The code or other identifying marking is unique to the particular batch of micro particles to uniquely identify that batch. The micro particles are removed from the support by a solvent. Preferably, a single laser device is used for cutting the substrate sheet and marking the micro particles. Alternatively, separate laser devices may be used for cutting the substrate sheet and marking the micro particles.

8 Claims, 2 Drawing Sheets

METHOD FOR PARTICLE PRODUCTION

CROSS-REFERENCE TO RELATED APPLICATION

This is a continuation-in-part of U.S. patent application Ser. No. 10/068,611 filed on Feb. 6, 2002, now abandoned.

BACKGROUND OF THE INVENTION

1. Field of the Invention

The present invention relates to a method for producing batches of large numbers of micro particles marked in such a manner as to uniquely identify each batch.

2. The Prior Art

Known methods for producing batches of identically and uniquely marked micro particles are based on a code formed from a plurality of digits, said digits being reproduced on a substrate by means of photo reduction, the substrate then being cut to form a batch of micro particles. The required numerical code is one sequence of multiple sequences of numbers. This results in the particles being excessively large due to the inclusion of irrelevant information.

Current laser marking techniques are based on substrates typically used in the micro-electronics industry to manufacture semi-conductors. These substrates are generally based on wafers of gold, silver or aluminum or of materials such as silicon or silicon dioxide. The particles are formed on the wafer through the deposition and etching processes of silicon micro-machining.

The prior art method for producing micro particles comprise a number of separate processes which increases the cost of production. In particular, separate processes are required for the marking of individual micro particles and the cutting of the substrate from which the micro particles are formed.

SUMMARY OF THE INVENTION

According to one embodiment of the invention, there is provided a method of producing batches of micro particles, comprising:

a) affixing a metal or plastic substrate sheet to a support, the sheet being constructed such that the metal can be evaporated by laser action, i.e., etching, without affecting the polymer layer and that such evaporation of the metal will form digits with good legibility when viewed under magnification;

b) a two stage, production of laser image etching or laser cutting of the substrate sheet by means of a laser device to define a plurality of micro particles. The first stage is approximate cutting or etching which provides the framework necessary to perform the second stage with precise alignment relative to the first stage;

c) in the second stage, either marking or cutting is performed to complete the process, thus providing the same amount of information on a much smaller particle. The coordinates created by the first step allow the laser to be precisely aligned to cut exactly around the digits, or mark the digits. In this procedure, each microparticle is guaranteed to have the required code etched thereon; and d) the use of a double adhesive layer that allows removal of the micro particles from the support in a manner that avoids cross contamination between different batches of particles with different numbers.

The first and second stages can be done in any order. The cutting could come first, with the marking occurring on the cut particles, or the marking could be done on the sheet with the cutting occurring afterward. Either way, the second stage is precisely aligned with the first stage so that marked microparticles with the smallest possible surface area are produced. The coordinates created in the first stage are used to precisely align the laser in the second stage so that very precisely cut and marked particles are created.

Preferably a single laser device is used for cutting the substrate sheet and marking the micro particles. Alternatively, separate laser devices may be used for respectively cutting the substrate sheet and marking the micro particles.

Preferably the code or other identifying marking is discernible by means of a contrast or colour, reflectance or light transmission.

In one embodiment of the invention, the substrate comprises a plastic material having a metal layer thereon, preferably formed by vacuum deposition, said code is formed by evaporation of the metal layer by means of the laser device to define a pattern or discernible code on each micro particle.

In an alternative embodiment of the invention, the substrate comprises a plastic material and the code is formed by burning holes in the substrate with the laser to define a pattern or discernible code on each micro particle.

Preferably said pattern or discernible code comprises a series of digits.

The substrate sheet may be affixed to the support by means of a suitable adhesive. Preferably the support comprises a flat sheet of inert material. In a preferred embodiment the support is formed from glass. Alternatively the support may be formed from a suitable plastic.

Preferably, the micro particles are removed from the support by the use of a suitable solvent containing some polymer as used in the preparation. This mixture is applied over the particles and the solvent seeps through to loosen the adhesive holding the particles in place. It also evaporates from the mixture applied to the top surface. As this dries and partly solidifies, it provides an ideal medium for trapping and handling 500+ micro particles in each batch with no chance of migration of particles between thousands of batches. The partly dried polymer layer, in which are trapped all the particles, is cut from the support and added to the bottle containing the product, wherein the solvent present dissolves the polymer liberating the particles. This is an important feature in the manufacture of a security products which could be used in court.

The method may include the further step of suspending the micro particles in a suitable medium to allow the micro particles to be painted or sprayed onto goods to be marked. Where the substrate comprises an aluminum material or an aluminum layer deposited on a plastic base, the medium in which the micro particles are suspended may contain an anti oxidant to prevent oxidation of the aluminum.

During steps (b) and (c) of the method, the support, and substrate sheet affixed thereto, may be mounted beneath one or more fixed laser devices such that the support is movable in a plane perpendicular to the axis of the one or more laser devices. Preferably the movement of the support with respect to the one or more laser devices is controlled by means of a computer.

According to a further aspect of the invention, there is provided a batch of micro particles produced by a method according to the first aspect of the invention.

In a further embodiment, a photographic image may also be used to provide the first image so long as it has all the features necessary for alignment of the laser to perform accurate cutting. This embodiment seeks to provide a viable alternative for producing large batches of marked micro particles.

The method according to this embodiment comprises the following steps: creating a photographic film having a plurality of codes marked thereon as well as markings for aligning a laser for cutting; placing the film on a support layer; cutting the film by means of a laser device according to the aligning markings on the film to define a plurality of micro particles, each micro particle containing the code; and removing the micro particles from the support.

By using photographic images to provide the high resolution characters on the individual micro particles, the present invention enables the use of relatively simple, far less expensive, $CO_2$ laser systems to carry out the step of forming the particles from the substrate.

Such laser systems are well understood, have good reliability and are the workhorses in several industries were high throughput and continuous output is required. As a result, these laser systems can be left to operate, with little intervention, on a 24 hours a day, 7 days a week basis. In addition, $CO_2$ laser systems also have minimal running costs, which normally equate to an exchange, re-gassed laser every 2–3 years.

The film used in the present method is preferably microfilm, as this is available in significant lengths. Preferably the step of creating the photographic film may comprise creating a spreadsheet on a computer, the spreadsheet having a plurality of cells, each of which contains one code. Once created, the spreadsheet is converted to a printable file and then printed onto the photographic film.

Preferably, the arrangement of the spreadsheet is set up to maximize the number of cells printed on the film. Advantageously, the step of cutting may comprise the alignment of the laser on the film by using count marks on each frame of the film to locate the frame under the laser. Also, the blacking out of cells at pre-set positions on the spreadsheet enables the use of a vision system to control the laser by detecting the blacked out cells and making adjustments to the laser so that the laser cuts precisely around each code.

Preferably, the method may further include the step of laminating the photographic film with a white backing. This provides the contrast needed to ensure that the black characters on the film, which is the middle layer, can be read irrespective of the color of the background upon which the micro particles may be resting.

Preferably, a backing layer is laminated onto the photographic film. This backing layer, which is preferably not cut by the laser during the present method, provides a base for the film layer and the white backing layer as they move through the system.

In situations where the above form of support layer is used it should be appreciated that the step of removing the micro particles from the support may preferably remove the micro particles from the base layer as well.

Preferably, the step of removing the micro particles from the support layer may involve the use of a solvent.

BRIEF DESCRIPTION OF THE DRAWINGS

In the drawings, which illustrate one embodiment of the present invention.

DETAILED DESCRIPTION OF THE PREFERRED EMBODIMENTS

Figures 1, 2:
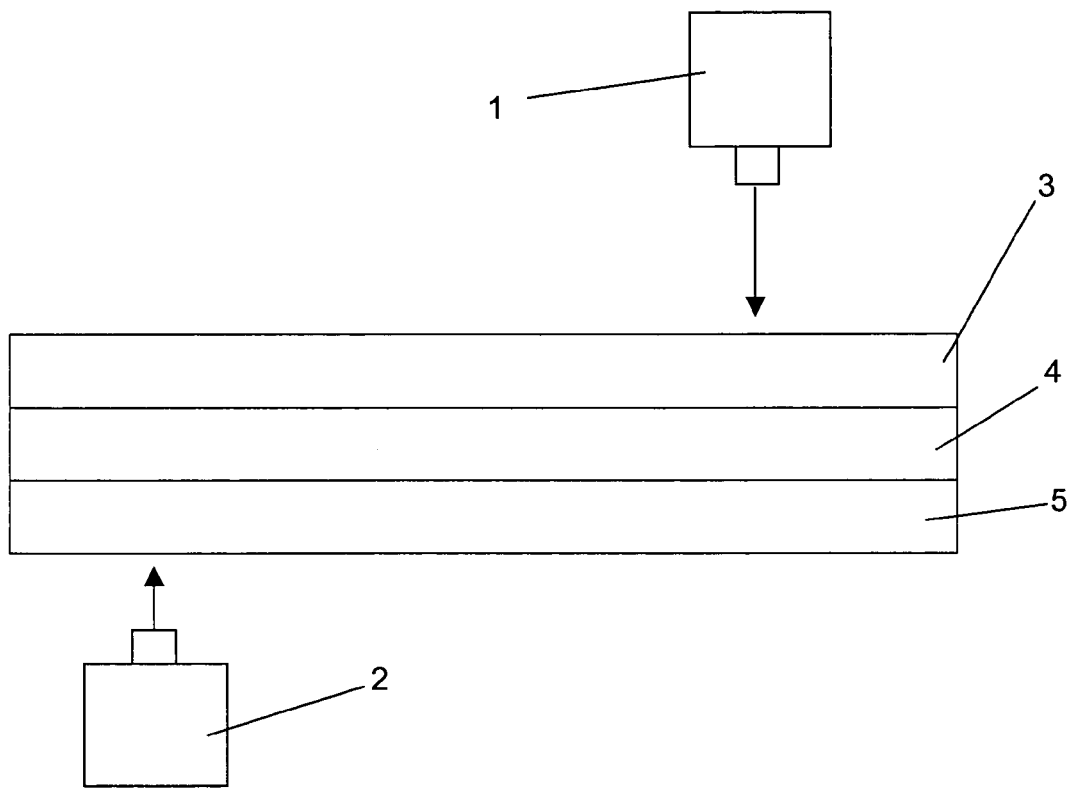
FIG. 1 shows an example of a spreadsheet with an arrangement of cells that would be transposed onto photographic film according to one embodiment of the invention.
FIG. 2 shows the arrangement of the various layers of the support layer and the film according to FIG. 1.

The present invention will be described further, by way of several non-limiting examples of a method of producing a batch of micro particles in accordance with the invention.

A sheet of suitable substrate typically 30 cm by 30 cm, such as a plastic/metal laminate with the metal layer applied via vacuum deposition or a plastic sheet, is adhered to a flat and inert support, preferably a flat sheet of glass by means of a suitable adhesive. A spray adhesive such as 3M Spray Mount Adhesive has been found to be particularly suitable.

The support, along with the substrate adhered thereto, is mounted on a stage movable in a plane perpendicular to a laser system. Movement of the stage in x-y coordinates is controlled by a computer.

The computer controls operation of the stage and the laser system such that the laser system marks the substrate with the desired code, preferably through the use of a mask marking several areas at once. The marking can be performed in several ways, but preferably through the formation of contrast either in color, reflectance or light transmission of the thus formed micro particle.

Prior to, simultaneously with or subsequent to the marking process described above, the micro particles are precisely cut through the use of either the same or a different laser which cuts through the substrate, which is still adhered to the support, in a predetermined manner, forming individual micro particles of predefined dimensions. The microparticles are cut precisely around the markings, so that the smallest possible microparticles, each containing an entire marking, are formed. The microparticles are formed precisely, thus maximizing the amount of useful data in the small amount of space available.

The particles so formed are removed from the support through the use of a suitable solvent acting on the adhesive holding the substrate to the support. The particles are then suspended in a suitable medium, the composition of which is dependent upon the nature of the particles and the use to which they are intended to be put.

The preferred method of application of the particles is by either painting or spraying this medium onto various goods to be marked. The particles can be used in numerous ways such as to prove ownership, to provide a means of tracking or in brand protection.

Two main methods of marking in this embodiment are envisaged.

The first of these involves the use of a plastic/metal laminate with the metal layer applied to a plastic base by means of vacuum deposition. The digits of the code applied to each particle are formed by evaporation of the metal layer through the action of the laser, the digits then being determined through the contrast between the metal and the plastic surfaces. Such laminates are commercially available, although the preferred laminate is 25 micron white P.E.T. with a 0.5 micron layer of aluminum.

An alternative method of marking involves the use of a plastic substrate, preferably 10 micron thick P.E.T., the digits of the code being formed on the substrate by the burning of holes in the substrate through the action of the laser to form a pattern or a discernible code.

The choice of adhesive for adhering the substrate to the support is important because variations in the combined thickness of the support and substrate can result in the surface of the substrate falling outside of the laser focus. Sprayable adhesives have been found to provide the most reproducible layers and the preferred of these is 3M Spray Mount Adhesive.

Glass sheet is the preferred material for the support due to the tighter tolerances on flatness provided over plastic materials.

Where a plastic/metal laminate is used for the substrate material, the stability of such has been found to be unreliable in certain solvent based systems (where a solvent based suspension medium is used for the application of the micro particles). The preferred metal is aluminum, however this has been found to oxidize in most solvent based systems. This problem has been overcome by the inclusion of an anti-oxidant in the formulation of the suspension medium, the preferred being a proprietary product known as SER AD 579 sold by Banner Chemicals.

Another method according to the invention involves the use of a photographic image as the basis for the information held on the particle. The first stage of the method of this embodiment is the creating of a photographic film that has a plurality of repeats of a unique code. In order to ensure that the same code is accurately repeated in an arrangement that will allow the convenient cutting up of the film into individual micro particles, a computer is used to generate the template that is to be applied to the photographic film.

Thus, that creation of the marked photographic film is carried out by the following events:

Number Generation

Unique codes were generated and stored in a Computer database. A block of numbers sufficient to fill a reel of film, approximately 2000, was taken form the table one at a time and transferred into a computer spreadsheet program such as Microsoft Excel®.

Spreadsheet Generation and Format

A default format was set up in the spreadsheet as the basis for the photographic frame. A spreadsheet consisting of 18 rows and 28 columns was found to be optimal for the laser processing of the subsequent photographic frame produced However, it will be appreciated that alternative numbers of rows and columns may be appropriate in situations where the size of the photographic film varies. The cell size with the film used in the preferred embodiment was, to some extent, determined by our requirement to obtain approximately 500 cells/spreadsheet.

The digit size within each cell was a variable and could be changed depending upon the amount of space available after laser cutting. In practice, Small Fonts 4 gave the best results. The font was used "bold" and the 9 digit number was "wrapped" within the cell to produce a block of digits similar to the shape of the cell. An example of a spreadsheet produced by the above method is shown in FIG. 1.

In order to form a border around the text, it was necessary to write the digits in two blocks separated with gaps. These gaps then provided the space around the digits to allow for the cutting line width of the laser and the heat effected zone. The number shown in FIG. 1 was written:

1234 56789

A code from the database was then transferred using a macro to this empty default spreadsheet and filled to occupy all the cells. This image was then digitally transferred to the film, after which the process was repeated with the next code until all the frames of the photographic film had been filled in this way.

In this manner most of the roll of microfilm may be used to hold approximately 2000 frames, each one being a spreadsheet and each one containing a large number of cells. Given a 12 second/batch production rate means that once started the device can be left to run for approximately 7 hours before any intervention is required.

Image Formation

The image was taken from the spreadsheet and written to microfilm digitally, at no point was any hard copy ever involved. In the presently described method Kodak® 16 mm microfilm was used. However, it is appreciated that any similar microfilm would be suitable. The image was written and developed using a Kodak Archive Writer®.

Once the image has been transferred to photographic film, the next step is to place the photographic film onto a support layer so that it can be more easily handled during the rest of the process. In a preferred embodiment of the present method, two different layers where applied to the photographic film.

In order to provide a contrast to assist reading of the digits on the micro particle, a white polymer layer was applied over the film. While several such entities were tested, a white P.E.T., 20 micron film was found to be best suited.

In terms of forming the laminate of the white layer and the film, various adhesive systems were tested. Polyurethane, two pack epoxy and heat activated adhesive all gave a good bond and the final choice is dependant upon the final application.

A heat activated adhesive was used in this case. A lamination temperature of 150° C. was used to form an initial bond between a 0.5 m wide roll of white P.E.T. film to a 0.5 m wide roll of the adhesive. Both rolls were 500 m in length. This 0.5 m wide roll of adhesive backed P.E.T. was then slit down to 15 mm wide and 33 m meter long rolls. These smaller rolls were then laminated directly to the microfilm.

Although higher temperatures produced a better bond, they also caused distortion and shrinkage in the film and so 150° C. was the maximum temperature used. Both the film layer and the white background layer are cut during laser processing, thus a support layer was required to provide the base on which these two layers are moved along the processing line.

A clear pressure sensitive tape was used with a heat resistant silicone adhesive. The laser energy was set such that while the other two layers of the laminate were cleanly cut, this tape was only slightly scored by the cutting action but otherwise remained intact.

The pressure sensitive tape has a very low tack adhesive such that when a solution of product polymer in solvent is applied and allowed to partly dry, the whole frame of particles will simply be lifted off this backing tape. While a preferred tape is made by 3M®, having part number 8901, it is appreciated that alternative tapes would be equally suitable for use in the present method.

The preferred laminate structure is as shown in FIG. 2 of the drawings. In FIG. 2, the three layers are at the top the White P.E.T. layer 3, then the microfilm layer 4, and at the bottom the base layer of clear backing tape 5. The laser 1 is positioned above the laminate and cuts through the top two layers 3 and 4. The vision system 2 is located on the reverse side of the laminate so that it can detect the alignment markings 10 (see FIG. 3) on the microfilm 4 through the clear backing tape 5.

Once the photographic film has been placed onto a suitable support layer, the whole laminate is ready to be cut up into individual micro particles. In the present method, this step is carried out using a relatively inexpensive laser system such as a $CO_2$ laser. The use of a less expensive laser is made possible by the removal of the need for a high resolution level to mark the unique characters on to the individual micro particles.

In order to ensure the accurate cutting of the micro particles, there was a need to ensure that the laminate and the cutting laser are correctly aligned with one another. In this regard the transposed spreadsheet frame also contains the alignment information required to accurately cut the particles.

This is in the form of a two step process, the first crude alignment uses the frame count marks along the film to reel the film into approximately the correct position.

Figures 3, 4:
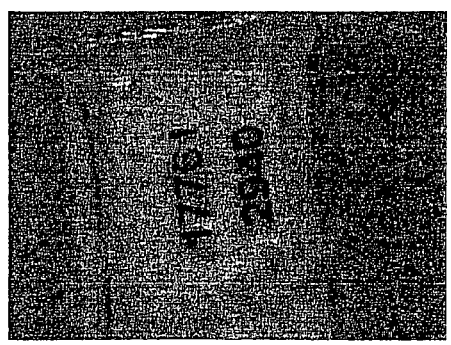
FIG. 3 shows an example of a frame with laser alignment points in the embodiment according to FIGS. 1 and 2.
FIG. 4 shows an example of the micro particles produced by the method according to FIGS. 1–3.

Next, the laser vision system aligns the laser head exactly with respect to the frame through the use of cells 20 placed within the frame at specific positions which are entirely black. These provide information on the size of the frame, exact position and any rotational displacement of the frame on the film. Given this alignment information, the laser then cuts the film into diced sections based on a preloaded cutting program designed to cut around each cell or block of digits. An example of a frame with alignment points 10 is shown in FIG. 3 of the drawings.

The laser cutting was performed on the laminate shown in FIG. 2, from the top downwards (i.e. through the white P.E.T. and microfilm). However the vision system allowing alignment for cutting, viewed the laminate from the bottom upwards (i.e. through the clear backing tape). As mentioned above, the laser was arranged so that only the top two layers were cut through entirely, with the bottom layer being left intact to maintain the structural stability of the laminate until the next step of the present method. It should also be appreciated that in this arrangement the support layer (not shown) would also need to be transparent to the vision system, in this regard, suitable forms of support layer will be appreciated by those of skill in the art.

In order to maximize the efficiency in laser cutting and the overall approach, two tracks were fitted to allow simultaneous alignment and cutting of two separate rolls of film. In this arrangement, the vision system provides alignment information for the first track which allows the laser to cut the specified frame of the first track. Then, while the laser was cutting first track, the vision system can move on to gather and store alignment information for the second track. In this way, as soon as the laser finishes cutting the first track, it would have all the information it required to begin cutting the second track. This alternating approach allows continuous laser cutting with no stoppage time for alignment. It gave a processing time of 12 seconds/frame and as there are in the order of 2000 frames/roll, two rolls being processed simultaneously would give 4000 batches of particles in approximately 7 hours.

At the start of each film, three frames were repeated to give the laser system time to line up accurately on the frames. The first two of these frames were subsequently scrapped. The final stage of the present method is the removal of the micro particles from the support layer/backing tape. The particles can be freed from the both the support layer and the backing tape using the solvent/polymer mix as previously described or by simply lifting off in solvent such as propan-2-ol.

In order to avoid possible cross contamination from frame to frame, each frame is coated with a polymer/solvent mixture, such that as the solvent evaporates the polymer left behind holds the particles in place and these are removed as one, wrapped in the soft polymer. This is then added to the product, wherein the solvent dissolves the polymer liberating the particles.

Photographic film was used as the basis for the digits, because as yet direct writing onto plastic using YAG laser systems does not give the same level of resolution and clarity.

The particles produced using the present method preferably have an edge length of between 300 and 500 microns. Character clarity and general appearance are both excellent. An example of the particles produced by the present method are shown in FIG. 4.

Accordingly, while only a few embodiments of the present invention have been shown and described, it is obvious that many changes and modifications may be made thereunto without departing from the spirit and scope of the invention.

What is claimed is:

1. A method for producing batches of micro particles, comprising the following steps:
   a) creating a photographic film having a plurality of codes marked thereon as well as markings for aligning a laser for cutting wherein the photographic film is created by creating a spreadsheet on a computer, said spreadsheet having a plurality of cells, and each cell containing one code, converting said spreadsheet to a printable file, and printing said file onto said film;
   b) placing said film on a support layer;
   c) cutting the film by means of a laser device according to said aligning markings on said film to define a plurality of microparticles, each microparticle containing said code wherein said film is cut by aligning the laser on the film using count marks on each frame of the film to locate the frame under the laser and blacking out cells at preset positions so that a vision system controlling the laser can detect said blacked out cells and make a final adjustment to the laser so that the laser cuts precisely around each code; and
   d) removing the micro particles from the support.

2. The method according to claim 1, wherein the film is a microfilm.

3. A method according to claim 2, wherein the movement of the support with respect to the one or more laser devices is controlled by means of a computer.

4. The method according to claim 1, wherein said spreadsheet is created so that a maximum number of cells are printed on said film.

5. The method according to claim 1, further comprising an additional step of laminating the photographic film with a white backing to increase contrast between the markings on the film and the film.

6. The method according to claim 1, further comprising an additional step of laminating the photographic film with a clear backing layer to provide a structural base for the film as it is being processed.

7. The method according to claim 1, wherein the step of removing the micro particles from the support layer comprises using a solvent acting on an adhesive holding the micro particles to the support.

8. A method for producing batches of micro particles, comprising the following steps:
   a) creating a photographic film having a plurality of codes marked thereon as well as markings for aligning a laser for cutting;
   b) placing said film on a support layer;
   c) cutting the film by means of a laser device according to said aligning markings on said film to define a plurality of microparticles, each microparticle containing said code; and
   d) removing the micro particles from the support;
   wherein continuous cutting is facilitated by simultaneously cutting a film frame from a first film at the same time as alignment information for a next film frame in the cutting order from a second film is being collected and stored.

* * * * *